(12) United States Patent
Harrat et al.

(10) Patent No.: US 8,467,964 B2
(45) Date of Patent: Jun. 18, 2013

(54) MULTI-USER INTERACTIVE MOTION TRACKING USING SENSORS

(75) Inventors: Newfel Harrat, Burlingame, CA (US); Leonid Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 501 days.

(21) Appl. No.: 12/765,745

(22) Filed: Apr. 22, 2010

(65) Prior Publication Data

US 2011/0260921 A1 Oct. 27, 2011

(51) Int. Cl.
*G01C 21/00* (2006.01)

(52) U.S. Cl.
USPC .......................................... 701/520

(58) Field of Classification Search
USPC ................. 701/408, 472, 485, 500, 502, 519, 701/520, 526
See application file for complete search history.

(56) References Cited

U.S. PATENT DOCUMENTS

| 6,445,344 | B1 | 9/2002 | Wise et al. |
| 2005/0068228 | A1 | 3/2005 | Burchfiel |
| 2007/0239350 | A1* | 10/2007 | Zumsteg et al. ............. 701/207 |
| 2009/0221298 | A1 | 9/2009 | Hanner |

OTHER PUBLICATIONS

International Search Report and Written Opinion—PCT/US2011/033640—ISA/EPO—Aug. 19, 2011.

* cited by examiner

*Primary Examiner* — Kim T Nguyen
(74) *Attorney, Agent, or Firm* — Liberty E. Mann

(57) ABSTRACT

Mobile platforms exchange their positions in a three-dimensional common reference frame based on data from their respective inertial sensors. The mobile platforms establish the common reference frame, e.g., by contacting each other. The position of each mobile platform is updated in its local reference frame and the position is transformed into a position in the common reference frame. The position in the common reference frame may then be transmitted to the other mobile platform, which can then determine the spatial relationship between the mobile platforms based on the received common reference frame position. Either mobile platform may pass the common reference frame to additional mobile platforms by establishing a new reference frame with a new mobile platform, generating a transformation from the new reference frame to the common reference frame and providing the transformation to the new mobile platform.

27 Claims, 4 Drawing Sheets

MULTI-USER INTERACTIVE MOTION TRACKING USING SENSORS

BACKGROUND

Inertial sensors, such as accelerometers and gyroscopes, are increasingly used in mobile application for location or orientation awareness. Inertial sensors in a mobile platform provide position, orientation and velocity data for the mobile platform without the need for an external reference. The position, orientation and velocity data may be used, e.g., for dead reckoning in pedestrian navigation, particularly when a valid starting position can be obtained, e.g., using satellite navigation systems. Other applications for inertial sensors include user interface (e.g., via gestures) and gaming.

Inertial sensors, however, provide data with respect to a local reference frame. The local reference frame for each mobile platform is affected by the precise orientation of the inertial sensors when mounted in the mobile platform as well as several sensor error sources. Consequently, the local reference frame for each mobile platform may be considered unique making the exchange of an inertial sensor derived position between mobile platforms difficult.

SUMMARY

Mobile platforms exchange their inertial sensor based positions using a common reference frame. The common reference frame is established by physical contact between the mobile platforms, which is used to define the common reference frame. The position of each mobile platform is updated in its local reference frame based on data provided by their respective sensors, which may include accelerometers, gyroscopes, magnetometers, and pressure sensors. The position in the local reference frame is transformed to a position in the common reference frame, which may be then transmitted to the other mobile platform. Upon receipt of the other mobile platform's position in the common reference frame, the spatial relationship between the two mobile platforms may then be determined. Additionally, if desired, either mobile platform may pass the common reference frame to one or more additional mobile platforms. For example, a new reference frame may be established between one of the mobile platforms and a new mobile platform by physical contact. A transformation from the new reference frame to the common reference frame may then be generated by the mobile platform and provided to the new mobile platform.

DETAILED DESCRIPTION

Figure 1:
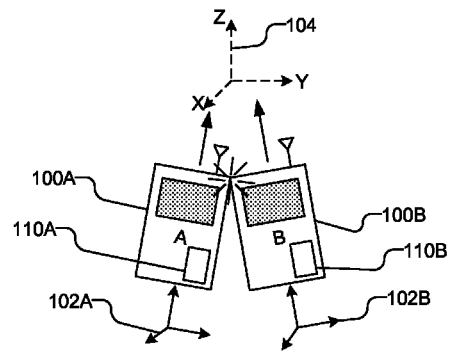
FIG. 1 illustrates two mobile platforms that determine their positions in their local reference frames based on data from inertial sensors and exchange their positions in a common reference frame.
Figure 2:
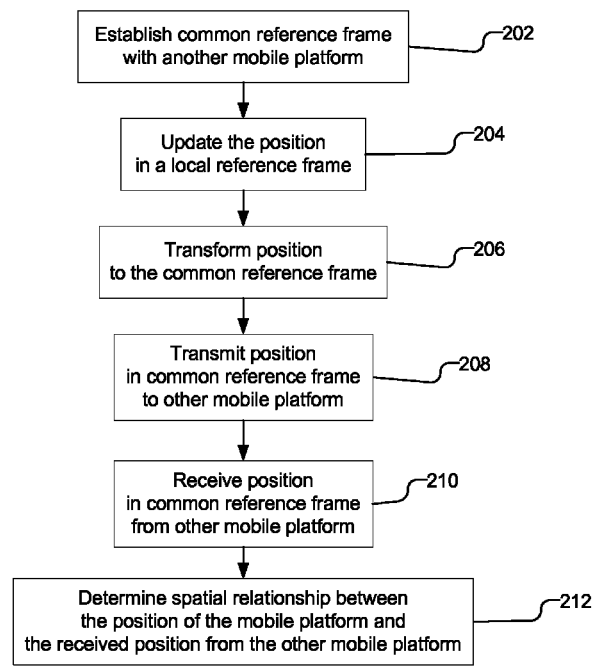
FIG. 2 is a flow chart illustrating a method of exchanging positions of mobile platforms in a common reference frame.

FIG. 1 illustrates two mobile platforms 100A and 100B (sometimes individually and collectively referred to herein as mobile platform 100) that determine their positions in their local reference frames 102A, 102B based on data from their respective inertial sensors 110A, 110B and exchange their positions in a common reference frame 104. FIG. 2 is a flow chart illustrating a method of exchanging positions of mobile platforms using a common reference frame. The mobile platform 100 of FIG. 1 may be a device such as a cellular telephone or other wireless communication device, personal communication system (PCS) device, personal navigation device (PND), Personal Information Manager (PIM), Personal Digital Assistant (PDA), laptop or other suitable mobile device which is capable of determining its position in a three-dimensional space using inertial sensors and transmitting/receiving wireless communication with other devices either directly or indirectly via short-range wireless, infrared, wireline connection, or other connection. The mobile platform may also be capable of receiving navigation signals, such as from a satellite positioning system (SPS), which typically includes a system of transmitters positioned to enable entities to determine their location on or above the Earth based, at least in part, on signals received from the transmitters.

As illustrated in FIG. 1, each mobile platform 100A, 100B has its own local reference frames 102A, 102B, respectively, illustrated as three-dimensional Cartesian coordinate systems. The local reference frame 102A, 102B of each mobile platform 100A, 100B, is affected by the precise orientation of the inertial sensors 110A, 110B within the mobile platforms 100A, 100B, as well as any of several error sources that affect the inertial sensors 110A, 110B, including DC offset and differing sensitivities along different axes as well as any non-orthogonality between different pairs of axes within the inertial sensors. Consequently, the local reference frame for each mobile platform 100A, 100B may be considered unique making the exchange of positions in three-dimensional space between mobile platforms 100A, 100B difficult.

Referring to the flow chart of FIG. 2, in order to exchange positions, a mobile platform establishes a common reference frame with another mobile platform in which the mobile platforms may easily communicate their respective positions to each other (202). The common reference frame 104 may be established through physical contact between the mobile platforms, i.e., tapping the mobile platforms together, as illustrated in FIG. 1, e.g., after the mobile platforms 100A, 100B, have been requested to track each other's position. When the mobile platforms 100A, 100B establish the common reference frame 104, a reference time (T0) is established as well. The establishment of the common reference frame includes generating the transformation between the local reference frame 102 and the common reference frame 104.

Figure 3:
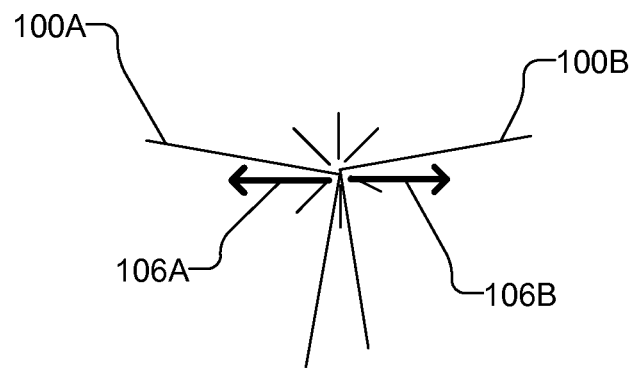
FIG. 3 illustrates the contact between two mobile platforms and the resulting acceleration vectors, which can be used to derive the common reference frame.

FIG. 3 illustrates a closer view of the contact between mobile platform 100A and mobile platform 100B to establish the common reference frame 104. Also illustrated in FIG. 3 is the acceleration vectors 106A, 106B, that result from the impact of the mobile platforms 100A, 100B, and which is detected by the inertial sensors 110A, 110B. The common reference frame 104 may be defined by the acceleration vectors by aligning one axis of the common reference frame 104, e.g., the Y-axis, with the direction of the acceleration vectors 106A and 106B. For example, the positive Y-axis of the common reference frame 104 may be defined by the acceleration vector that extends to the right from the point of impact, e.g., an acceleration vector 106B detected by mobile platform 100B, and the negative Y-axis may be defined by the acceleration vector that extends to the left from the point of impact, e.g., acceleration vector 106A detected by mobile platform 100A. Right and left of the point of impact may be determined based on the detected motion of the mobile platforms 100A, 100B before or after the impact. The Z-axis of the common reference frame 104 may be determined by aligning the sides of the mobile platforms 100A, 100B, e.g., the back sides, when physical contact is made. The mobile platforms may be placed on a surface, e.g., a wall or table so that a more accurate alignment of the sides of the mobile platforms may be achieved during initialization. The plane defined by the aligned sides may be used to define the Z-axis. The X-axis and Z-axis may then be determined according to the right hand rule. The origin of the common reference frame 104 may be the point of contact between the mobile platforms 100A, 100B. An ambiguity of, e.g., 2 cm-5 cm may be tolerated in the origin of the common reference frame 104. If desired, an additional contact or tap between the mobile platforms may be used to provide additional information. For example, a line between the two contacts can be determined from a second contact that is at a different location than the first contact. The line may serve as the reference axis. The second contact may also provide information as to which sides of the mobile platforms are in contact. It should be understood that the specific examples provide herein are merely for illustration and are not limiting. For example, the axes of the common reference frame 104 may have any desired orientation. Moreover, reference frames other than Cartesian may be used. Further, other methods of establishing the common reference frame 104 may be used. For example, if desired, a double contact between the mobile platforms 100A, 100B may be used, where the acceleration vectors produced by the two separate contacts may be used to define the X-Y plane of the common reference frame 104. As discussed above, one axis of the common reference frame may then be aligned with the either the first or second acceleration vectors, with the remaining axes defined by the right hand rule.

Figure 4:
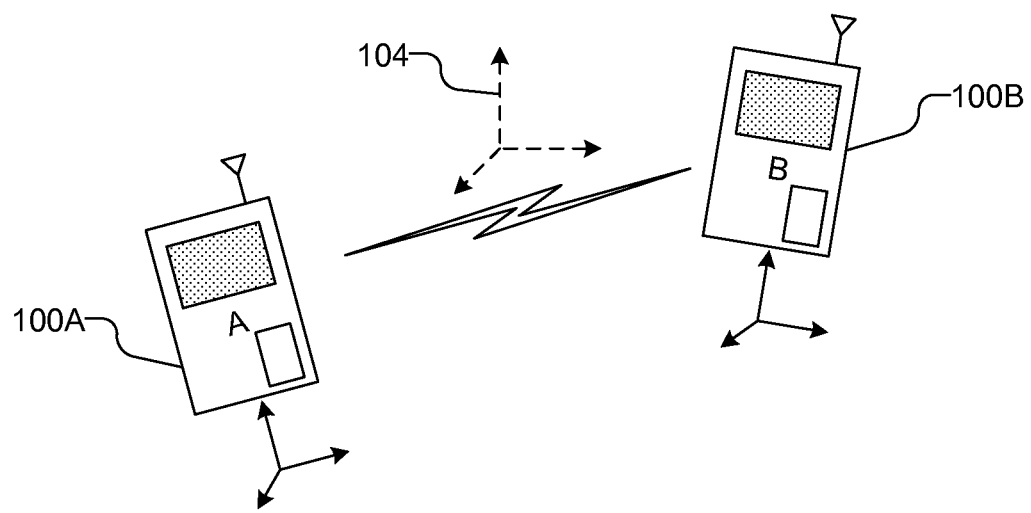
FIG. 4 illustrates the two mobile platforms wirelessly communicating their respective positions in terms of the common reference frame.

Referring to FIG. 2, the position computed from the acceleration, velocity and heading, the orientation and the altitude (sometimes collectively referred to as position) of each mobile platform is updated in the individual mobile platform's local reference frame 102A, 102B (204). The position of the mobile platforms may be updated in the local reference frames using data provided by the inertial sensors 110A, 110B. Before the mobile platforms 100A, 100B report their respective position to one another, the position in the local reference frame is transformed to a position in the common reference frame 104 (206). The mobile platforms 100A, 100B can transmit their respective position in the common reference frame (208). The transmission may be time stamped relative to the reference time, i.e., elapsed time since time T0. Thus, each mobile platform 100A, 100B receives the other's position in the common reference frame (210). FIG. 4, by way of example, illustrates mobile platforms 100A, 100B wirelessly communicating their respective positions in terms of the common reference frame 104.

The data transmission between mobile platforms 100A, 100B may be implemented in conjunction with various wireless communication networks, including a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

After receiving the position of the other mobile platform in the common reference frame 104, each mobile platform can determine the spatial relationship between the mobile platforms (212), which may be stored in memory. For example, after receiving the position of the mobile platform 100B in the common reference frame 104 that is time stamped with a time T1, the mobile platform 100A may compare its own position in the common reference frame at time T1 to the position of mobile platform 100B. Alternatively, the spatial relationship may be determined in the local reference frame after transforming the received position into the local reference frame. The transformation and transmission of the position of each mobile platform (i.e., blocks 206 and 208 in FIG. 2) may be performed at the same frequency and in sync so that the compared positions are from the same reference time. Time synchronization may be based on the wireless protocol reference clocks. Wireless transceivers are synchronized to one another either through a base station or through peer to peer tight time synchronization. For example, in the case of Bluetooth, the master reference time may be used as a reference for the time stamps. Bluetooth protocol supports reading the master clock and the slave clock with the offset from the master clock. Where the mobile platforms are connected to the internet, a reference clock could be obtained as a reference to UTC (Universal Time Clock) and all local coordinates will be time stamped with the UTC clock.

Figure 5:
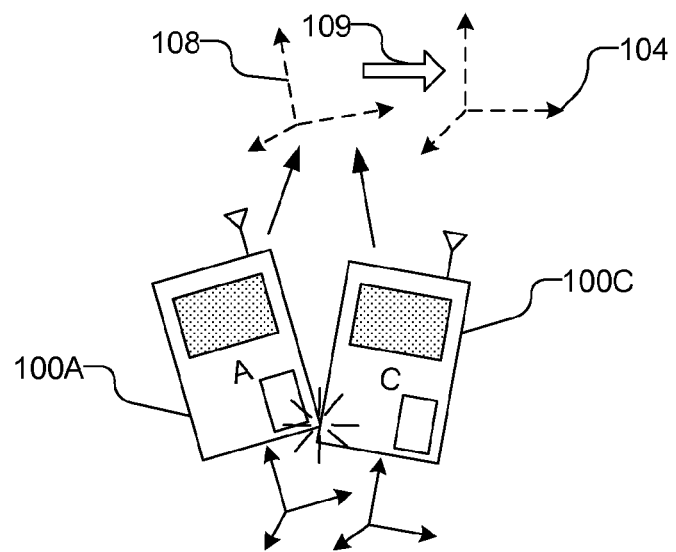
FIG. 5 illustrates passing the established common reference frame to a new mobile platform.
Figure 6:
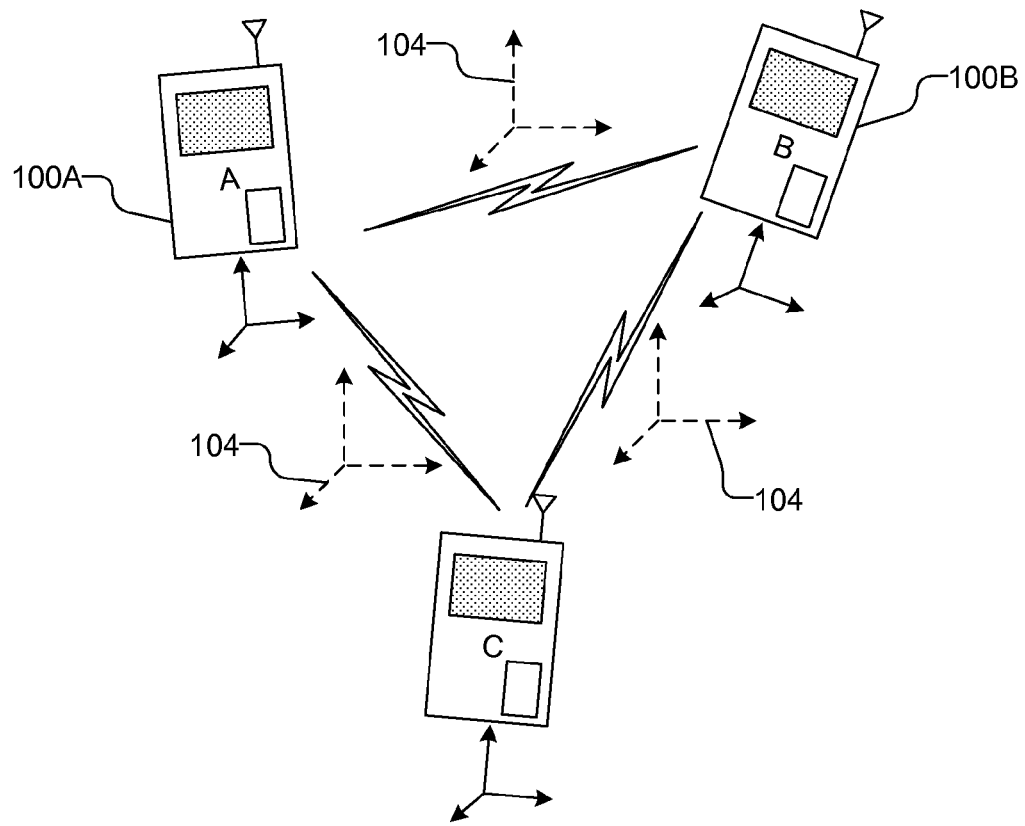
FIG. 6 illustrates three mobile platforms wirelessly communicating their respective positions in terms of the common reference frame.

As illustrated in FIG. 5, the established common reference frame 104 may be passed to additional mobile platforms. For example, mobile platform 100A, which has already established a common reference frame 104 with mobile platform 100B, may pass the common reference frame 104 to a different mobile platform 100C. The common reference frame 104 is passed to the new mobile platform 100C by initiating physical contact. As described above, from the contact between the two mobile platforms 100A and 100B, a new reference frame 108 shared by mobile platforms 100A and 100B can be generated, along with a new reference time ($T_N0$). Mobile platform 100A can then generate a transformation from the new reference frame 108 to the desired common reference frame 104, along with a transformation from the new reference time ($T_N0$) to the desired reference time (T0) plus any elapsed time. Mobile platform 100A can then transmit the reference frame and time transformations (illustrated by arrow 109 in FIG. 5) to the new mobile platform 100C, which then performs the transformations to adopt the common reference frame 104 and reference time as discussed above. The mobile platforms 100A, 100B, and 100C may then wirelessly communicating their respective positions with each other in terms of the common reference frame 104 as illustrated in FIG. 6. If desired, the common reference frame 104 and reference time may be passed to additional mobile platforms.

Figure 7:
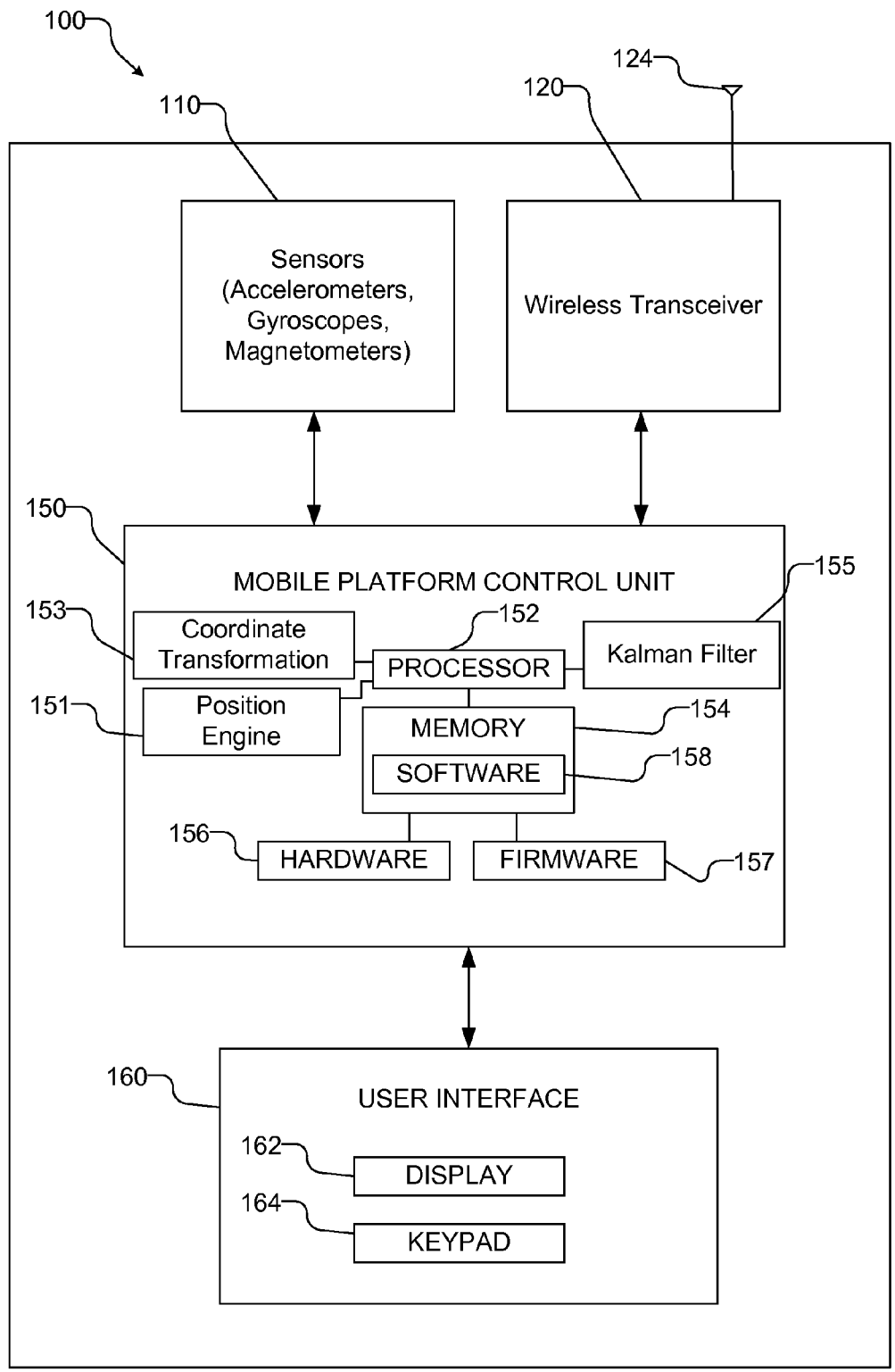
FIG. 7 is a block diagram of a mobile platform that is capable of establishing a common reference frame with another mobile platform, determining its position in a local reference frame based on its inertial sensors and exchanging positions with the other mobile platform in the common reference frame.

FIG. 7 is a block diagram of a mobile platform 100 that is capable of establishing a common reference frame with another mobile platform, determining its position in a local reference frame based on its inertial sensors and exchanging positions with the other mobile platform in the common reference frame. As illustrated in FIG. 7, the mobile platform 100 includes sensors 110, which may include inertial sensors such as a three-dimensional accelerometer and/or gyroscope, as well as other sensors that may be used to determine position and orientation, such as a magnetometer or pressure sensors. Mobile platform 100 also includes a transmitter/receiver (transceiver) 120 for wirelessly communicating via an antenna 124 with other mobile platforms, either directly or indirectly as discussed above.

The sensors 110 and transceiver 120 are connected to and communicate with a mobile platform control unit 150. The mobile platform control unit 150 accepts and processes data from the sensors 110 and the transceiver 120 and controls the operation of the device. The mobile platform control unit 150 may be provided by a processor 152 and associated memory 154, hardware 156, software 158, and firmware 157. If desired, additional processors may be used. As illustrated, the mobile platform control unit 150 includes a position engine 151 that determines the position in the local reference frame based on data from the sensors 110 and may be used to determine the spatial relationship between mobile platforms. Additionally, mobile platform control unit 150 includes a coordinate transformation unit 153, which performs the transformations between the local reference frame and common reference frame as discussed above and which are at least temporarily stored in memory 154. Additionally, the mobile platform control unit 150 may include a Kalman filter 155. The Kalman filter 155 may be used to predict and estimate the position and heading of the mobile platform based on the signals from the sensors 110. Additionally, the Kalman filter 155 may be used to predict the position of a peer mobile platform 100B provided the peer mobile platform 100B provides its data from its sensors to the mobile platform 100A. Thus, a mobile platform can estimate both its own position and trajectory and the position and trajectory of a peer mobile platform. The position engine 151, coordinate transformation unit 153 and Kalman filter are illustrated separately from processor 152 for clarity, but may be within the processor 152 if desired.

It will be understood as used herein that processors can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored. The results or intermediate results of any processing, such as positions in the local reference frame and the common reference frame and the determined spatial relationships may be stored in memory 154.

The mobile platform 100 also includes a user interface 160 that is in communication with the mobile platform control unit 150, e.g., the mobile platform control unit 150 accepts data and controls the user interface 160. The user interface 160 includes a display 162 that displays information as well as control menus and a keypad 164 or other input device through which the user can input information into the mobile platform 100. In one embodiment, the keypad 164 may be integrated into the display 162, such as a touch screen display. The user interface 160 may also include, e.g., a microphone and speaker, e.g., when the mobile platform 100 is a cellular telephone.

The mobile platform 100 thus includes a means for establishing a common reference frame with a second mobile platform, which, for example, may include a means for detecting contact with the second mobile platform, which may be the sensors 110, as well as the position engine 151 and coordinate transformation unit 153 for determining the common reference frame. A means for updating the position of the mobile platform in a local reference frame may include the sensors 110 for detecting movement of the mobile platform and providing data in response to the position engine 151, which updates the position. A means for transforming the position of the mobile platform in the local reference frame into a position of the mobile platform in the common reference frame may include the coordinate transformation unit 153 and a means for providing the position of the mobile platform in the common reference frame to the second mobile platform may include the wireless transceiver 120. The mobile platform may also include a means for receiving a position of the second mobile platform in the common reference frame, such as the wireless transceiver 120 and a means for determining a spatial relationship between the mobile platform and the second mobile platform based on the received position of the second mobile platform in the common reference frame, which may be the position engine 151, which may compare the position of the mobile platform in the common reference frame to the position of the second mobile platform in the common reference frame. Additionally, the means for determining the spatial relationship may include a means for transforming the position of the second mobile platform in the common reference frame into a position of the second mobile platform in the local reference frame, which may be the coordinate transformation unit 153, and the position engine 151 compares the position of the mobile platform in the local reference frame to the position of the second mobile platform in the local reference frame. The mobile platform may include a means for passing the common reference frame to a third mobile platform, which may include, for example, means for establishing a new reference frame when the mobile platform and the third mobile platform contact, which may be the sensors 110, as well as a means for generating a transformation from the new reference frame to the common reference frame, which may be the coordinate transformation unit 153 and a means for providing the transformation to the third mobile platform, which may be the wireless transceiver 120. Additionally, a means for receiving a position of the third mobile platform in the common reference frame may include the wireless transceiver 120 and a means for means for determining a spatial relationship between the mobile platform and the third mobile platform based on the received position of the second mobile platform in the common reference frame may include the which may be the position engine 151. It should be understood that described means may include additional or other structures disclosed herein which may assist in one or more aspect of the described functions, such as processor 152 and memory 154, and may include structural equivalents thereof.

The methodologies described herein may be implemented by various means depending upon the application. For example, these methodologies may be implemented in the Kalman filter 155, processor 152 or in hardware 156, firmware 157, software 158, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 154 and executed by the processor 152. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. For example, the computer-readable media may be encoded with program code to establish a common reference frame based on a detected contact; program code to update a position in a local reference frame based on data from inertial sensors; program code to transform the position in the local reference frame to a position in the common reference frame; and program code to cause the transmission of the position in the common reference frame. Additionally, the computer-readable medium may include program code to determine a spatial relationship between the position in the common reference frame and a received position in the common reference frame or program code to transform a received position in the common reference frame to a received position in the local reference frame and program code to determine a spatial relationship between the position in the local reference frame and the received position in the local reference frame. Additionally, the computer-readable media may include program code to establish a new reference frame based on a different detected contact; program code to generate a transformation from the new reference frame to the common reference frame; and program code to cause the transmission of the transformation.

The computer-readable media may include physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
establishing a common reference frame between a first mobile platform and a second mobile platform when the first mobile platform and the second mobile platform physically contact;
updating a position of the first mobile platform in a local reference frame for the first mobile platform;
transforming the position in the local reference frame into a position of the first mobile platform in the common reference frame; and
transmitting with the first mobile platform the position of the first mobile platform in the common reference frame.

2. The method of claim 1, further comprising:
receiving a position of the second mobile platform in the common reference frame; and
determining a spatial relationship between the first mobile platform and the second mobile platform based on the received position of the second mobile platform in the common reference frame.

3. The method of claim 2, wherein determining the spatial relationship is performed by comparing the position of the first mobile platform in the common reference frame to the position of the second mobile platform in the common reference frame.

4. The method of claim 2, wherein determining the spatial relationship is performed by transforming the position of the second mobile platform in the common reference frame into a position of the second mobile platform in the local reference frame and comparing the position of the first mobile platform in the local reference frame to the position of the second mobile platform in the local reference frame.

5. The method of claim 1, wherein updating the position of the first mobile platform is performed using data from at least one of accelerometers, gyroscopes, magnetometers, and a pressure sensor.

6. The method of claim 1, wherein the position includes orientation and altitude.

7. The method of claim 1, further comprising:
passing the common reference frame from the first mobile platform to a third mobile platform;
receiving a position of the third mobile platform in the common reference frame; and
determining a spatial relationship between the first mobile platform and the third mobile platform based on the received position of the third mobile platform in the common reference frame.

8. The method of claim 7, wherein passing the common reference frame from the first mobile platform to the third mobile platform comprises:
establishing a new reference frame when the first mobile platform and the third mobile platform physically contact;
generating a transformation from the new reference frame to the common reference frame; and transmitting the transformation to the third mobile platform.

9. A mobile platform comprising:
inertial sensors that provide data with respect to a position of the mobile platform;
a wireless signal transceiver for receiving and transmitting wireless signals;
a processor connected to the inertial sensors and the wireless signal transceiver, the processor receives the data from the inertial sensors;
memory connected to the processor; and
software held in the memory and run in the processor, the software including instructions causing the processor to establish a common reference frame between the mobile platform and a second mobile platform when the inertial sensors detect physical contact between the mobile platform and the second mobile platform, to update a position of the mobile platform in a local reference frame based on the data from the inertial sensors, transforming the position of the mobile platform in the local reference frame to a position of the mobile platform in the common reference frame, and to cause the wireless signal transceiver to transmit the position of the mobile platform in the common reference frame.

10. The mobile platform of claim 9, wherein the wireless signal transceiver receives a wireless signal that includes a position of the second mobile platform in the common reference frame, the software further including instructions causing the processor to determine a spatial relationship between the mobile platform and the second mobile platform based on the received position of the second mobile platform in the common reference frame.

11. The mobile platform of claim 10, wherein the software causes the processor to determine the spatial relationship by comparing the position of the mobile platform in the common reference frame to the position of the second mobile platform in the common reference frame.

12. The mobile platform of claim 10, wherein the software causes the processor to determine the spatial relationship by transforming the position of the second mobile platform in the common reference frame into a position of the second mobile platform in the local reference frame and comparing the position of the mobile platform in the local reference frame to the position of the second mobile platform in the local reference frame.

13. The mobile platform of claim 9, wherein the inertial sensors comprise at least one of accelerometers and gyroscopes.

14. The mobile platform of claim 9, wherein the position includes orientation and altitude.

15. The mobile platform of claim 9, wherein the software further includes instructions causing the processor to pass the common reference frame to a third mobile platform and to determine a spatial relationship between the mobile platform and the third mobile platform based on a signal received by the wireless signal transceiver with a position of the third mobile platform in the common reference frame.

16. The mobile platform of claim 15, wherein the software that includes instructions causing the processor to pass the common reference frame to the third mobile platform comprises instructions to establish a new reference frame when the mobile platform and the third mobile platform physically contact, to generate a transformation from the new reference frame to the common reference frame, and to cause the wireless signal transceiver to transmit the transformation to the third mobile platform.

17. A mobile platform comprising:
means for establishing a common reference frame with a second mobile platform when the mobile platform and the second mobile platform physically contact;
means for updating a position of the mobile platform in a local reference frame;
means for transforming the position of the mobile platform in the local reference frame into a position of the mobile platform in the common reference frame; and
means for providing the position of the mobile platform in the common reference frame to the second mobile platform.

18. The mobile platform of claim 17, further comprising:
means for receiving a position of the second mobile platform in the common reference frame; and
means for determining a spatial relationship between the mobile platform and the second mobile platform based on the received position of the second mobile platform in the common reference frame.

19. The mobile platform of claim 18, wherein the means for determining the spatial relationship comprises means for comparing the position of the mobile platform in the common reference frame to the position of the second mobile platform in the common reference frame.

20. The mobile platform of claim 18, wherein the means for determining the spatial relationship comprises means for transforming the position of the second mobile platform in the common reference frame into a position of the second mobile platform in the local reference frame and comparing the position of the mobile platform in the local reference frame to the position of the second mobile platform in the local reference frame.

21. The mobile platform of claim 17, wherein the position includes orientation and altitude.

22. The mobile platform of claim 17, further comprising:
means for passing the common reference frame to a third mobile platform;
means for receiving a position of the third mobile platform in the common reference frame; and
means for determining a spatial relationship between the mobile platform and the third mobile platform based on the received position of the third mobile platform in the common reference frame.

23. The mobile platform of claim 22, wherein the means for passing the common reference frame to the third mobile platform comprises:
means for establishing a new reference frame when the mobile platform and the third mobile platform physically contact;
means for generating a transformation from the new reference frame to the common reference frame; and
means for providing the transformation to the third mobile platform.

24. A non-transitory computer-readable medium including program code stored thereon, comprising:
program code to establish a common reference frame based on a detected physical contact;
program code to update a position in a local reference frame based on data from inertial sensors;
program code to transform the position in the local reference frame to a position in the common reference frame; and
program code to cause a transmission of the position in the common reference frame.

25. The non-transitory computer-readable medium of claim 24, wherein the program code further comprises program code to determine a spatial relationship between the position in the common reference frame and a received position in the common reference frame.

26. The non-transitory computer-readable medium of claim 24, wherein the program code further comprises program code to transform a received position in the common reference frame to a received position in the local reference frame and program code to determine a spatial relationship between the position in the local reference frame and the received position in the local reference frame.

27. The non-transitory computer-readable medium of claim 24, wherein the program code further comprises:
   program code to establish a new reference frame based on a different detected physical contact;
   program code to generate a transformation from the new reference frame to the common reference frame; and
   program code to cause a transmission of the transformation.

* * * * *